May 6, 1952
S. WAY ET AL
2,595,999
POWER PLANT COMBUSTION APPARATUS HAVING
APERTURED COMBUSTION CHAMBER WALLS
Filed Nov. 23, 1943
3 Sheets-Sheet 1
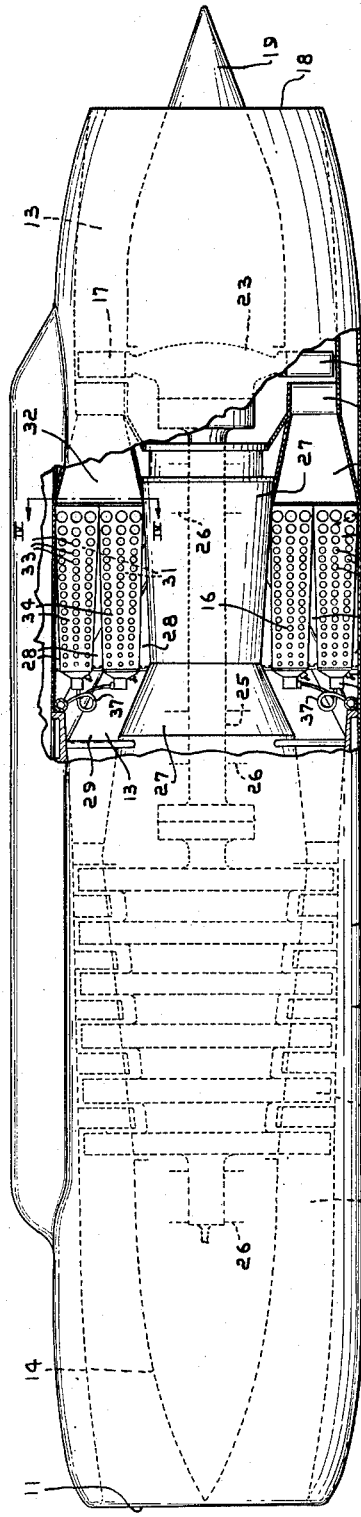
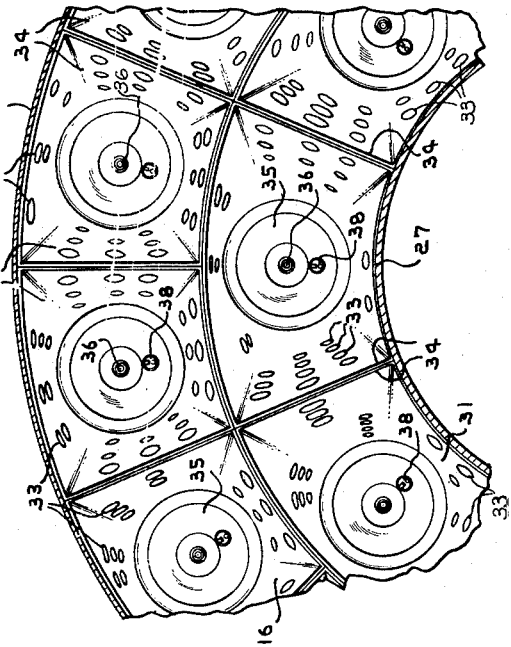
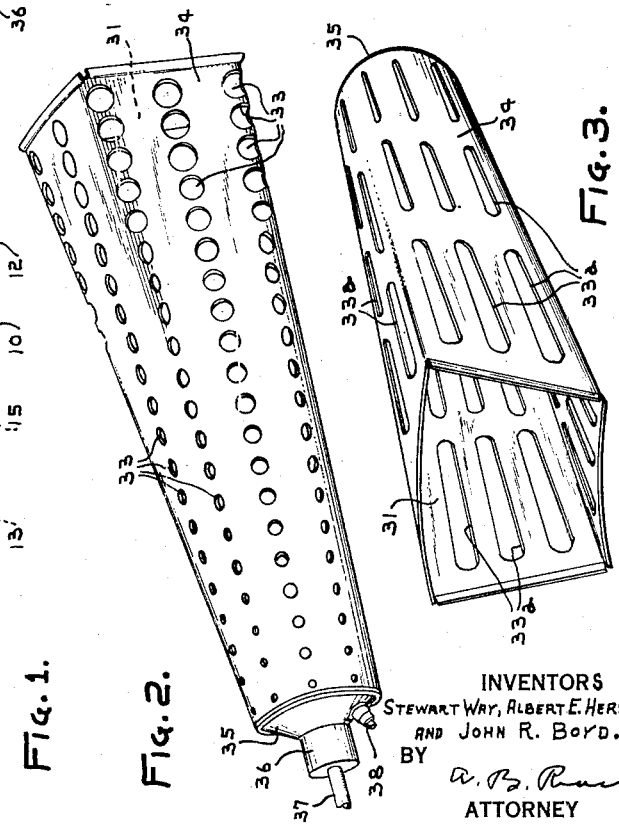
INVENTORS
Stewart Way, Albert E. Hershey
and John R. Boyd.
BY
ATTORNEY

WITNESSES:

INVENTORS
STEWART WAY, ALBERT E. HERSHEY
AND JOHN R. BOYD.
BY
ATTORNEY

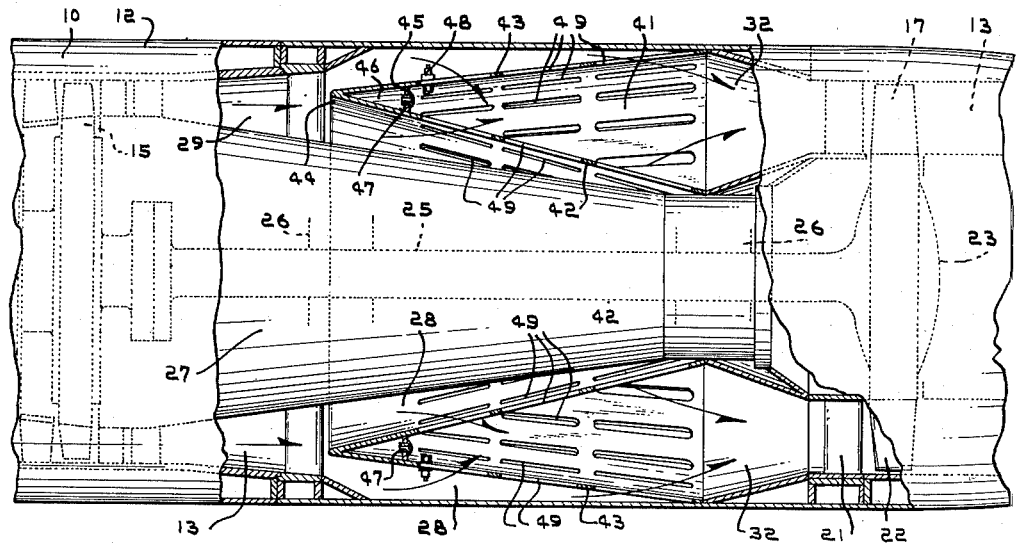
FIG. 10.
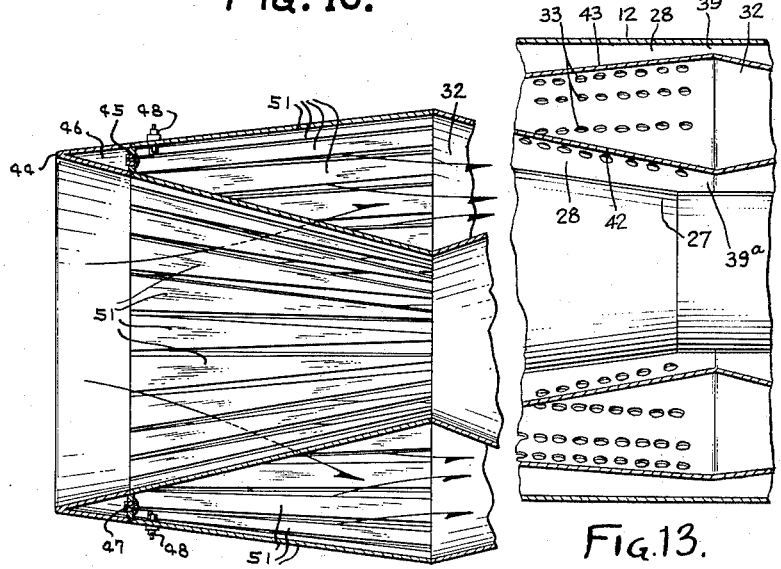
FIG. 11.
FIG. 13.
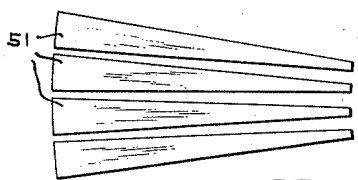
FIG. 12.
INVENTORS
STEWART WAY, ALBERT E. HERSHEY
AND JOHN R. BOYD.
BY
ATTORNEY Patented May 6, 1952

2,595,999

UNITED STATES PATENT OFFICE 2,595,999

POWER PLANT COMBUSTION APPARATUS HAVING APERTURED COMBUSTION CHAMBER WALLS

Stewart Way, Pittsburgh, and Albert E. Hershey, Wilkinsburg, Pa., and John R. Boyd, Urbana, Ill., assignors to Westinghouse Electric Corporation, East Pittsburgh, Pa., a corporation of Pennsylvania Application November 23, 1943, Serial No. 511,468

8 Claims. (Cl. 60—39.65)

This invention relates to power plants and particularly to combustion apparatus for a gas turbine and it has for an object to provide an improved device of the character set forth.

The present invention, although not limited thereto, is particularly adapted for use in a gas turbine power plant of the type employed on aircraft to drive the propeller, electric generator or supply motive fluid for jet propulsion of the aircraft. Such a plant preferably comprises a streamlined tubular casing having mounted axially therein a compressor adjacent the forward or inlet end, a turbine adjacent the rearward or discharge end, and combustion apparatus located between the compressor and turbine for heating the compressed air and which discharges the hot gases at a suitable temperature and pressure to the turbine. The spent gases on leaving the turbine are discharged through a nozzle provided at the rear of the casing and may aid in propelling the aircraft.

It is imperative that the physical dimensions and weight of a plant of this character be kept at an absolute minimum, and consequently the combustion apparatus must be small requiring it to function with high velocities of flow and to realize rates of energy release of the order of $30 \times 10^6$ B. t. u. per cubic foot per hour.

If the power plant is mounted in a nacelle or built into a wing, and even when mounted in the fuselage, the frontal area of the plant must be maintained at a minimum to reduce drag, with the result that the velocities of the hot gases leaving the combustion apparatus are high and these velocities should be about 200 to 300 feet per second.

It is accordingly a further object to provide a combustion apparatus of small size which is capable of handling a large volume of air and fuel mixture and complete combustion of the fuel in a relatively small space.

A power plant of this character operates over a wide range of fuel rates since the fuel rate for peak load, as at take-off, may be as much as ten times that for idling at high elevation. Further, the combustion apparatus must be able to burn the fuel and heat the air supplied by the compressor to a peak temperature which may be 1500 F. or even higher without danger of distorting the walls or causing excessive creep or corrosion of the apparatus.

The pressure drop across the combustion chamber, comparing the state at two stations of equal velocity, should be kept at an absolute minimum since the pressure drop decreases the power which can be developed by the turbine driven by the hot gases discharging from the combustion apparatus.

The above-mentioned features, limitations, and requirements for the combustion apparatus of the gas turbine power plant for aircraft use apply also, but perhaps not as critically, to gas turbine power plants on small vessels of high power and speed, particularly naval craft or in any installation where space and weight are at a premium. It is, accordingly, a further object of the invention to provide an improved combustion apparatus capable of satisfying the above-mentioned limitations and requirements in a gas turbine power plant.

These and other objects are effected by the invention as will be apparent from the following description and claims taken in accordance with the accompanying drawings, forming a part of this application, in which:

Fig. 1 is a side elevation of a gas turbine power plant in which the present invention has been incorporated, a portion of the outer casing and several of the burner cells being removed to better illustrate the combustion apparatus;

Fig. 2 is a perspective view, looking from the side and front end, of one of the burner cells of the combustion apparatus illustrated in Fig. 1;

Fig. 3 is a perspective view looking from near the discharge end of a burner cell similar to the one illustrated in Fig. 2, but having a series of air-inlet slots instead of circular holes;

Fig. 4 is a sectional view taken substantially on the line IV—IV of Fig. 1 and showing the arrangement of a group of burner cells;

Fig. 10 is a view corresponding to Fig. 8 illustrating a further modification of the invention wherein the circular air inlet openings are replaced by slots;

Fig. 11 is a vertical sectional view of a modified burner in which the combustion chamber is defined by spaced strips providing continuous air inlet slots;

Fig. 12 is a developed plan view of a portion of the inner wall of the combustion chamber shown in Fig. 11, and Fig. 13 is a fragmentary view of a modification of the structure shown in Fig. 8.

Figure 5:
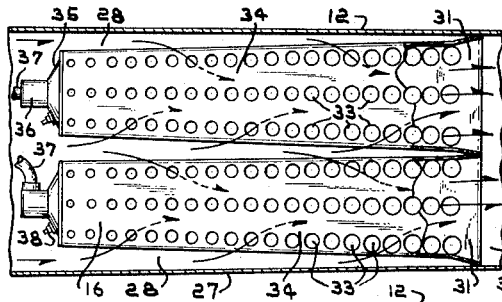
Fig. 5 is an enlarged view of a portion of Fig. 1 and illustrating, by arrows, the approximate course of air into the combustion cells and the path of the hot gases leaving the cells.

The power plant shown in Fig. 1, and generally indicated 10, is adapted to be mounted in or on the fuselage or wing of an airplane with the left or intake end 11, as viewed in this figure, pointed in the direction of flight.

The plant comprises an outer shell or casing structure 12 providing an annular air duct or passage 13 extending fore and aft with respect to the aircraft. This casing has mounted therein along its longitudinal axis a fairing cone 14 adapted to house fuel and lubricating pumps and ignition apparatus, an axial-flow compressor 15, combustion apparatus generally indicated 16, a turbine 17 which drives the compressor, and a nozzle 18 defined by the casing 12 and by a tailpiece 19, the latter being mounted concentrically in the casing and cooperating with the latter to provide a propulsion jet.

Air enters at the intake end 11 and flows substantially straight through the plant, passing through the compressor 15, where it is compressed, and into the combustion apparatus 16, where it is heated. The hot gases, comprising the products of combustion and excess air heated by the combustion, on leaving the combustion apparatus, are directed by suitable guide vanes or nozzles 21 against the blades 22 of the turbine disc 23 and then are discharged through the propulsion nozzle 18 to propel the aircraft.

The present invention is not limited to the specific details or arrangement of the structure thus far described, but it is primarily concerned with the combustion apparatus which heats the compressed air supplied by the compressor without disturbing the straight-through flow of the plant, thereby permitting a design of small maximum diameter.

By reference to Fig. 1, it will be noted that the compressor and turbine rotors are interconnected by means of a shaft 25 supported in suitable bearings, indicated at 26, and enclosed by an inner casing structure, generally indicated 27, which protects the shaft and bearings from high temperatures and also defines the portion of the annular air flow passage 13 in which the combustion apparatus 16 is mounted.

In order to maintain the combustion apparatus and the outer casing structure of small maximum diameter, the combustion apparatus is divided by wall structure into an air space or spaces 28 open to the discharge end of a diffuser passage 29 leading from the compressor, and which overlap a burner space or spaces 31 open to a passage 32 leading to the turbine guide vanes 21. Atomized fuel is supplied to the forward end of the burner space or spaces which are also provided with ignition means. The dividing wall structure has openings 33 therein to provide for entry into the burner space of compressed air from the overlapping air spaces, the entering air supporting combustion of fuel and mixing with the hot products of combustion to provide a motive fluid comprising a mixture of air and products of combustion of suitable temperature for driving the turbine.

The dividing wall structure separating the air and burner spaces may be constituted in any suitable manner, provided that it is disposed so that the air space overlaps axially the burner space or spaces and so that air may flow into the latter along the structure to enable combustion to be completed or substantially completed within the axial length of the burner spaces. In this way, the axial length of the apparatus is kept at a minimum because it does not require the division of the air stream into two distinct streams of primary and secondary air, the primary air being used to complete the combustion, with the remaining secondary air stream being mixed with the combusted gases to lower the final temperature.

The openings 33 in the dividing wall structure are of increasing size in the downstream direction of the apparatus, so that an initially fuel-rich air-fuel mixture is gradually and continuously diluted with greater and greater quantities of air, and, as this takes place, combustion is completed. Thus, there is avoided any subsequent mixing of hot and cold streams, combustion being completed and the products being diluted in the burner space whereby the apparatus as a whole is compact and the axial length is minimized.

The dividing wall structure is, furthermore, arranged to provide an air space or spaces which converge and a burner space or burner spaces which diverge in a downstream direction, so that there is a minimum velocity of the combusted gases within the burner spaces, resulting in completion of the combustion within the shortest possible length and reduction in the flow losses.

The combustion apparatus illustrated in Figs. 1 to 5, inclusive, comprises a plurality of tapered sheet metal burner tubes or cells 34 supported in and extending around the annular passage 13. The burners are arranged with their smaller ends upstream and with their larger ends secured together as shown in Fig. 4, providing the air space 28 of decreasing flow area downstream between the burners. While the burners may be grouped in any desired manner, as shown in Fig. 4, the burner cells may be arranged in groups of three, the two outermost cells of each group overlying an inner cell with the lateral edges of the large ends of the cells arranged along radii of the plant.

Figure 7:
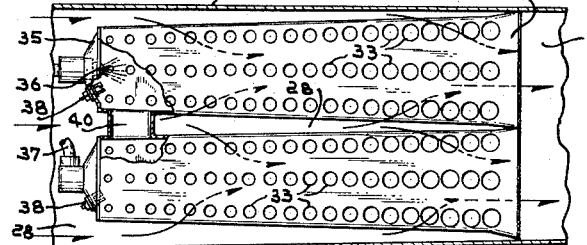
Fig. 7 is a view corresponding to Fig. 5, illustrating another modification of the invention wherein the interiors of adjacent burner cells are interconnected.

The upstream ends of the burner cells are closed as indicated at 35, and provided with fuel-atomizing nozzles 36 such as shown in Fig. 7. Fuel under pressure is supplied to these nozzles from a suitable pump and reservoir (not shown) through supply pipes 37. Suitable means for igniting the fuel, such as a spark plug 38, project through the closed end of each cell.

The lateral wall of each burner is in one form of this invention, provided with a large number of holes 33 which are preferably arranged in rows extending lengthwise of the burner. The size of these openings gradually increases from the upstream end of the tube to the downstream end. These openings admit the compressed air flowing in the air spaces 28 to the burner spaces 31 where it is intimately mixed with the fuel supplied by the atomizers 36 and burned. The total area of the openings in each tube is preferably about 1.1 to 1.4 times the area of the large or outlet ends of the cells or tubes.

The arrangement of openings in the walls 34 of the burner tubes should be in the form of axial rows so as to produce a number of axial rows of air jets entering the burning space, these axial rows of jets tending to reinforce one another and thereby penetrate farther into the burning zone, and also provide space between the rows for the burning gases to flow axially.

The size of the openings should increase in the downstream direction because most of the air should flow through the holes farthest downstream as the pressure in the burning space is there the lowest, and for a given total hole area the lowest pressure drop across the whole combustion chamber is assured by placing the largest holes were the pressure drop from outside to inside the burner space is greatest as is the case at the downstream end. Moreover, if uniform hole sizes were used the velocity at the upstream end of the burner tube would be so high as to make the burning unstable.

Instead of employing the holes 33 shown in the burner cell in Fig. 2, slots 33a of increasing width from the small end of the burner to the large discharge end may be provided as shown in Fig. 3.

Figure 6:
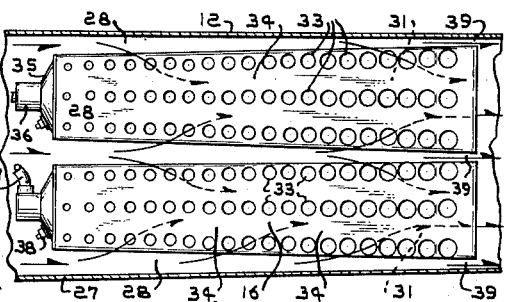
Fig. 6 is a view corresponding to Fig. 5 and illustrating a slightly modified form of the invention providing for the by-pass of some of the compressed air past the burner cells.

Referring to the modification shown in Fig. 6, it will be noted that the large ends of the burner tubes do not close off the air passage 13 but leave slots or passages 39 which permit a part of the compressed air to by-pass the burner spaces. The advantage of this arrangement is that a layer of relatively cool air flows along the surfaces of the inner casing structure 27 and the outer casing structure 12 up to the end of the burner tubes where it mixes with the hot gases discharging from the latter. This by-passed air maintains the casing structures relatively cool. A further advantage is that the pressure drop across the burner is reduced because the mass flow out of the end of the burner is reduced by the amount of air by-passed around the burner.

In Fig. 7, there is illustrated a slightly modified form of the invention wherein adjacent burner tubes are interconnected by means of a conduit 40 to insure that all of the burners remain ignited. It will be understood that the tubes may be connected in this manner in pairs or that each tube may be connected to more than one adjacent tube. In the event that burning in one of the tubes should stop, the increased pressure in the ignited tube or tubes causes burning gases in the ignited tube or tubes to ignite the extinguished tube through the connecting conduits 40. This feature may be employed in either form of the invention shown in Figs. 5 and 6.

Figure 8:
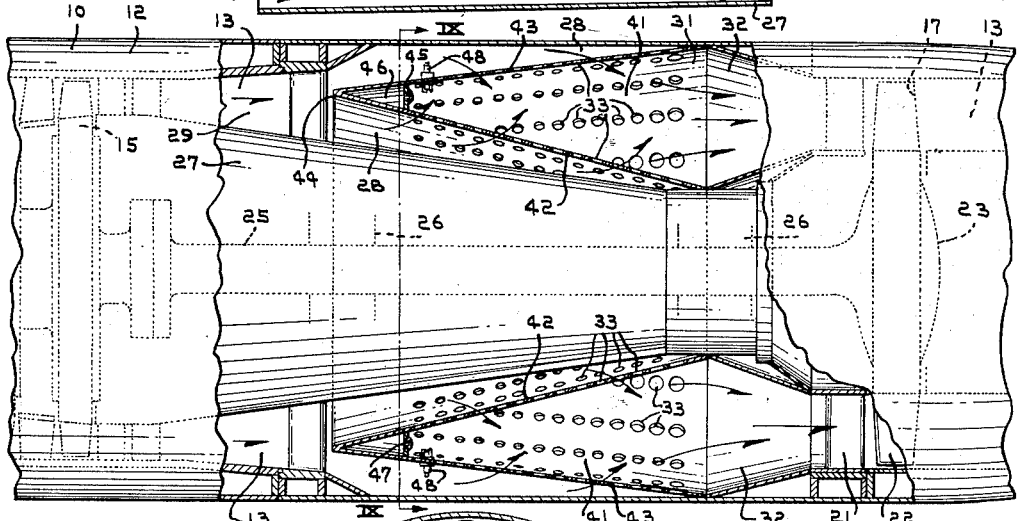
Fig. 8 is a view corresponding to the broken-away portion of Fig. 1 and illustrating a modified type of burner in the form of a continuous annular chamber of frusto-conical section.
Figure 9:
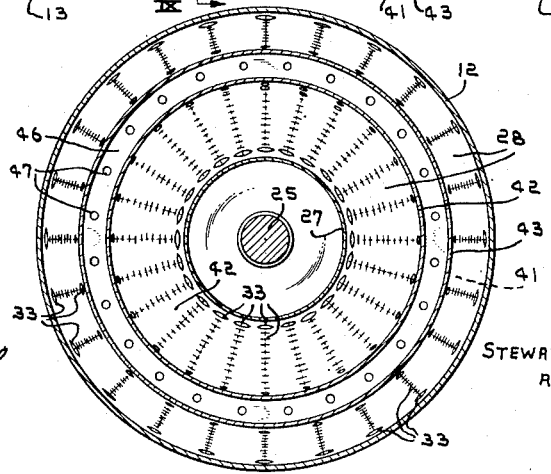
Fig. 9 is a sectional view taken substantially on the line IX—IX of Fig. 8.

Instead of employing a plurality of separate burner tubes, the combustion or burner space may comprise a single annular space 41 tapered axially of the combustion apparatus. This structure is well adapted to fit into the annular air passage 13, and, as shown particularly in Figs. 8 and 9, may comprise an inner cone 42 and an outer cone 43 tapered in opposite directions. These cones are secured together, providing a closed end 44. A partition wall or ring 45 mounted within cones 42 and 43 and spaced from the closed end 44 provides an annular chamber 46 to which fuel under pressure may be supplied by any suitable means. The wall 45 is provided with a plurality of circumferentially and preferably equally spaced fuel atomizing nozzles 47 so that the fuel supplied to the annular chamber is sprayed into the annular combustion space 41. The walls of the cones 42 and 43 are perforated in a manner similar to the burner tube shown in Fig. 2 previously described for admitting the compressed air flowing from the compressor into the burner space 41. As in the case of the other forms of the invention, a plurality of circumferentially-spaced igniting means, such as sparkplugs 48, are provided for igniting the air-fuel mixture within the burner space.

While the large ends of the cones 42 and 43 are shown as engaging the inner and outer casing structures closing the downstream end of the overlapping air spaces, it will be understood that slots 39a or the like similar to those shown at 39 in Fig. 6 may be provided if it is desired to by-pass some of the compressed air around the burner space.

The walls of the cones 42 and 43 may have instead of axial rows of perforations, axial slots 49 such as shown in Fig. 10, with these slots being equivalent in area to the row of holes that might otherwise be used. The slots become wider in the downstream direction just as the holes become larger in the downstream direction and for the same reasons.

The walls of the cones 42 and 43 may in fact be made up of grid bars 51 as shown in Figs. 11 and 12 with slots between them as described above, the bars preferably being of channel cross section to provide added rigidity.

The rows of openings in the cones 42 and 43, whether actually rows of perforations or simple slots, should be equal in number to the number of fuel nozzles or some integral multiple of the number of fuel nozzles so that one or more rows of holes is definitely associated with each fuel nozzle. The rows of openings in the inner and outer cones 42 and 43 are preferably placed directly opposite one another radially, and should also be placed symmetrically with respect to the nozzles, the rows of holes being either in line with the nozzles or preferably spaced midway between the nozzles. By placing the rows of air inlet openings opposite one another the air jets entering through the openings impinge on each other and cause considerable turbulence and mixing of the cold and hot gases.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. Power plant combustion apparatus for heating compressed air to provide high-velocity motive fluid comprising a casing structure, a central core structure defining with said casing structure an annular flow passage, a wall structure mounted within said annular passage and dividing said passage into a burner space and a pair of overlapping air spaces at opposite sides thereof, said wall structure including a pair of conical wall elements joined at their forward ends and forming a burning space diverging relatively toward the rear, the wall elements having apertures therein to provide for the admission of air from the air space to the burner spaces.

2. Combustion apparatus as set forth in claim 1 wherein the wall elements comprise spaced strips providing elongated apertures extending from the front to the rear ends of the wall elements, said apertures being of increasing width toward the rear end of said wall elements.

3. Power plant combustion apparatus for heating compressed air to provide high-velocity motive fluid for a gas turbine or the like comprising a tubular structure defining a passage for flow of compressed air, a wall structure mounted within said passage and dividing said passage into a burner space and an overlapping air space, said wall including a pair of conical wall elements joined at their forward ends and forming a burning space diverging relatively toward the rear, a wall member between said conical wall elements providing with the joined forward ends of the conical elements a closed annular chamber, and fuel nozzles in said wall member for discharging fuel from said annular chamber into said burner space, said conical wall elements having apertures therein rearwardly of said wall member to provide for admission of air from the air space to the burner space.

4. Structure as specified in claim 3, wherein the apertures in the conical wall elements are arranged in axially-extending rows, said rows being circumferentially spaced and alternating with the fuel nozzles.

5. Power plant combustion apparatus for heating compressed air to provide high-velocity motive fluid comprising an annular casing structure, a central core structure concentric relative to said casing structure and defining therewith an annular flow passage, a wall structure mounted concentrically within said annular passage and dividing said passage into an intermediate burner space and inner and outer compressed air spaces overlapping said burner space, said wall structure comprising a pair of conical wall elements joined at their forward ends and forming a burning space of generally increasing cross-sectional area from front to rear, said wall elements having apertures therein to provide for admission of air to the burner space from the overlapping air spaces.

6. Power plant combustion apparatus for the heating of compressed air to provide high-velocity motive fluid comprising inner and outer radially-aligned tubular wall structures, said wall structures being spaced radially throughout a major portion of their length with the space therebetween providing a circumferentially-continuous combustion zone; an elongated core structure surrounded by said tubular wall structures; a tubular casing surrounding said wall structures, said wall structures being spaced radially throughout a major portion of their length from said core structure and said casing, the space between said inner wall structure and said core structure providing an inner circumferentially-continuous passage for flow of compressed air axially of said core structure, and the space between said outer wall structure and said tubular casing providing an outer circumferentially-continuous passage for flow of compressed air axially of said tubular casing, said circumferentially-continuous combustion zone being of lesser cross-sectional area at its upstream end than at its downstream end; and fuel admission apparatus for supplying fuel to said combustion zone and so disposed circumferentially as to provide for combustion with a circumferentially-continuous flame formation, said wall structures being apertured for flow of compressed air therethrough from said inner and outer air flow passages to said combustion zone, whereby said annular flame formation is supplied with air at both the inner and outer sides thereof.

7. Power plant combustion apparatus for the heating of compressed air to provide high-velocity motive fluid comprising inner and outer radially-aligned tubular wall structures, said wall structures being spaced radially throughout a major portion of their length with the space therebetween providing a circumferentially-continuous combustion zone; an elongated core structure surrounded by said tubular wall structures; a tubular casing surrounding said wall structures, said wall structures being spaced radially throughout a major portion of their length from said core structure and said casing, the space between said inner wall structure and said core structure providing an inner circumferentially-continuous passage for flow of compressed air axially of said core structure, and the space between said outer wall structure and said tubular casing providing an outer circumferentially-continuous passage for flow of compressed air axially of said tubular casing, said circumferentially-continuous combustion zone being of lesser cross-sectional area at its upstream end than at its downstream end; and fuel admission apparatus for supplying fuel to said combustion zone near one end thereof and so disposed circumferentially as to provide for combustion with a circumferentially-continuous flame formation, said wall structures being provided with apertures spaced axially from each other and from the ends of the wall structures for admitting air from said compressed-air flow passages to said combustion zone, whereby said circumferentially-continuous flame formation is supplied with air at both the inner and outer sides thereof at spaced points in its length.

8. In power plant combustion apparatus for the heating of compressed air to provide high-velocity motive fluid, inner and outer concentric and radially-spaced annular casings defining therebetween an annular path for flow of gases axially of the casings; inner and outer annular wall structures in said flow path between said inner and outer casings and arranged concentrically relative to the latter, said wall structures being spaced from each other and from the inner and outer casings throughout a major portion of their lengths with the space between said wall structures constituting an annular combustion zone overlapped outwardly by an annular compressed air flow path defined by the outer casing and the outer wall structure and overlapped inwardly by an annular compressed air flow path defined by the inner casing and the inner wall structure; and an annular series of nozzles for supplying fuel under pressure to said combustion chamber and so disposed circumferentially as to provide for combustion with an annular flame formation, said wall structures being apertured and so disposed with respect to each other and to the inner and outer casings that the annular combustion zone widens from its upstream end toward its downstream end and the inner and outer annular compressed air flow paths narrow from their upstream ends toward their downstream ends, whereby at least a portion of the air entering said flow paths passes therefrom to said combustion zone through the apertures in said wall structures and supplies said annular flame formation with air at both the inner and outer sides thereof.

STEWART WAY.
ALBERT E. HERSHEY.
JOHN R. BOYD.

(References on following page)

REFERENCES CITED

The following references are of record in the file of this patent:

UNITED STATES PATENTS

| Number | Name | Date |
|---|---|---|
| 515,422 | Chandler | Feb. 27, 1894 |
| 635,919 | Curtis | Oct. 31, 1899 |
| 812,513 | Moreno et al. | Feb. 13, 1906 |
| 1,542,326 | Sawyer | June 16, 1925 |
| 1,837,763 | De Lancey | Dec. 22, 1931 |
| 1,923,614 | Clarkson | Aug. 22, 1933 |
| 2,072,731 | Crosby | Mar. 2, 1937 |
| 2,225,775 | Garrett | Dec. 24, 1940 |
| 2,268,464 | Seippel | Dec. 30, 1941 |
| 2,326,072 | Seippel | Aug. 3, 1943 |
| 2,360,130 | Heppner | Oct. 10, 1944 |
| 2,405,723 | Way | Aug. 13, 1946 |
| 2,409,177 | Allen et al. | Oct. 15, 1946 |

FOREIGN PATENTS

| Number | Country | Date |
|---|---|---|
| 210,655 | Switzerland | Oct. 16, 1940 |
| 497,772 | France | Sept. 24, 1919 |
| 542,528 | France | May 18, 1922 |

OTHER REFERENCES

"Flugsport," No. 2/1939, Bd. 31, Seite 33, Fig. 16.